(12) United States Patent
Fong

(10) Patent No.: US 10,838,848 B2
(45) Date of Patent: Nov. 17, 2020

(54) SYSTEM AND METHOD FOR TEST GENERATION

(71) Applicant: ROYAL BANK OF CANADA, Montreal (CA)

(72) Inventor: Cory Fong, Toronto (CA)

(73) Assignee: ROYAL BANK OF CANADA, Montreal (CA)

( * ) Notice: Subject to any disclaimer, the term of this patent is extended or adjusted under 35 U.S.C. 154(b) by 13 days.

(21) Appl. No.: 15/996,107

(22) Filed: Jun. 1, 2018

(65) Prior Publication Data

US 2018/0349256 A1    Dec. 6, 2018

Related U.S. Application Data

(60) Provisional application No. 62/513,651, filed on Jun. 1, 2017.

(51) Int. Cl.
| | |
|---|---|
| *G06F 11/36* | (2006.01) |
| *G06N 3/02* | (2006.01) |
| *G06N 3/00* | (2006.01) |
| *G06N 3/08* | (2006.01) |
| *G06N 3/04* | (2006.01) |
| *G06F 40/30* | (2020.01) |
| *G06F 40/35* | (2020.01) |

(Continued)

(52) U.S. Cl.
CPC ........ *G06F 11/3684* (2013.01); *G06F 40/284* (2020.01); *G06F 40/30* (2020.01); *G06F 40/35* (2020.01); *G06N 3/006* (2013.01); *G06N 3/02* (2013.01); *G06N 3/0454* (2013.01); *G06N 3/08* (2013.01); *G06N 5/022* (2013.01)

(58) Field of Classification Search
CPC ............ G06F 11/3688; G06F 11/3664; G06F 11/3668; G06F 8/43; G06F 17/2785; G06F 11/3676; G06F 17/30684; G06F 11/3684; G06F 40/35; G06F 40/284; G06F 40/30; G06N 99/005; G06N 3/02; G06N 3/006; G06N 20/00; G06N 3/0454; G06N 3/08; G06N 5/022
See application file for complete search history.

(56) References Cited

U.S. PATENT DOCUMENTS

| | | | |
|---|---|---|---|
| 6,119,112 A | * | 9/2000 | Bush ........................ G06N 3/08 706/25 |
| 9,047,414 B1 | * | 6/2015 | Matyjek .............. G06F 11/3688 |

(Continued)

OTHER PUBLICATIONS

Suresh Thummalapenta et al.; Automating Test Automation; ICSE; pp. 881-891; retrieved on Jun. 17, 2020. (Year: 2012).*

(Continued)

*Primary Examiner* — S. Sough
*Assistant Examiner* — Cuong V Luu
(74) *Attorney, Agent, or Firm* — Norton Rose Fulbright Canada LLP; Brian Chau

(57) ABSTRACT

Computer implemented methods and systems are provided for generating one or more test cases based on received one or more natural language strings. An example system comprises a natural language classification unit that utilizes a trained neural network in conjunction with a reinforcement learning model, the system receiving as inputs various natural language strings and providing as outputs mapped test actions, mapped by the neural network.

20 Claims, 16 Drawing Sheets

(51) Int. Cl.
*G06F 40/284* (2020.01)
*G06N 5/02* (2006.01)

(56) References Cited

U.S. PATENT DOCUMENTS

| | | | | |
|---|---|---|---|---|
| 9,519,858 | B2* | 12/2016 | Zweig | G06N 3/04 |
| 9,940,933 | B2* | 4/2018 | Choi | G10L 15/183 |
| 2014/0229158 | A1* | 8/2014 | Zweig | G06N 3/04 |
| | | | | 704/9 |
| 2015/0339019 | A1* | 11/2015 | Ledenev | G06F 3/0484 |
| | | | | 715/772 |
| 2016/0155436 | A1* | 6/2016 | Choi | G10L 15/183 |
| | | | | 704/232 |
| 2017/0060855 | A1 | 3/2017 | Song et al. | |
| 2018/0011780 | A1* | 1/2018 | Aggarwal | G06F 11/3672 |

OTHER PUBLICATIONS

Chuanqi Tao et al.; An Approach to Mobile Aplication Testing Based on Natural Language Scripting; ResearchGate; 7 pages; retrieved on Jun. 17, 2020 (Year: 2017).*
International Search Report and Written Opinion issued in International Application No. PCT/CA2018/050658, dated Aug. 9, 2018.
Glorot et al., "Deep Sparse Rectifier Neural Networks", Proceedings of Machine Learning Research, vol. 15, pp. 315-323, 2011.
Schmidhuber, "Deep Learning in Neural Networks: An Overview", Neural Networks, vol. 61, pp. 85-117, 2015.
Schwanke et al., "Using Neural Networks to Modularize Software", Machine Learning, vol. 15, pp. 137-168, 1994.
Goldberg, "A Primer for Neural Network Models for Natural Language Processing", https://arxiv.org/abs/1510.00726, Oct. 2015.

* cited by examiner

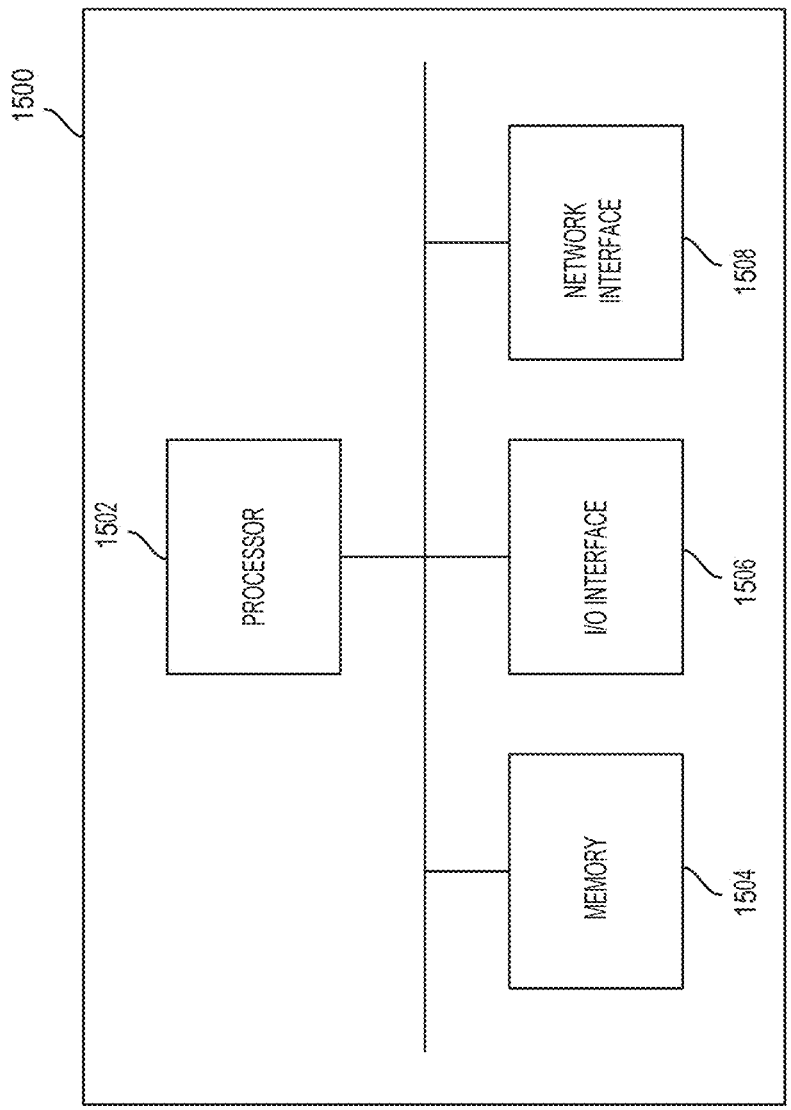

SYSTEM AND METHOD FOR TEST GENERATION

CROSS REFERENCE

This application is a non-provisional of, and claims all benefit, including priority of U.S. Provisional Application No. 62/513,651 filed 1 Jun. 2017, entitled "SYSTEM AND METHOD FOR TEST GENERATION", incorporated herein by reference.

FIELD

The present disclosure generally relates to the field of test generation, and more specifically, to machine-learning approaches to generate test scenarios based on parsed natural language inputs.

INTRODUCTION

Traditional test case automation within the process of quality assurance and the software development lifecycle is technically challenging. A "test case automation developer" for an application likely needs to have basic development skills in addition to knowledge of the application logic, valid application use cases, and a technical understanding of the application's components. In a test case automation, automation developers may be using a framework for test case authoring, and actions used within test cases for basic functionality to interact with the application has been developed.

There may be an existing non-trivial set of relevant legacy test data, and although a tester can perform his/her task without it, test automation frameworks are generally used to provide guidelines to building a logically sound and functional test case. They also provide a way to encourage consistency in test case authoring. However, the need for a test case automation developer, and the required expertise, provide a burden on organizations that seek to conduct testing on a large scale.

SUMMARY

Existing approaches have a requirement of technical familiarity with whatever testing framework is being used. The tester will need know how to utilize a pseudo-programming language which tends to have extensive functionality and a wide range of permutations to the functionality through further configuration.

The effectiveness of the testing framework is limited to the capability of the user's understanding of the capabilities of the framework. Due to this limitation, there is a gap in the consistency and effectiveness of the tests being created. This gap increases when new users use the framework to create tests.

A computational approach for generating test scripts based on natural language descriptions of test cases is provided in some embodiments. The computational approach utilizes a specially configured neural network, pre-trained using legacy test automation data, to identify at least one of a correlation to functional intent and functional language. The computational approach automatically associates (e.g., adds, generates) usable test data/configurations for test cases. The ability to accurately classify natural language sentences to identify an intent and robustly explore permutations of inputs and intelligently converging on an agreeable state makes the use of neural networks (e.g., convolutional neural networks) and reinforcement learning ideal. Word by word processing is utilized to build vectors based on the natural language sentences.

The pre-trained neural network includes a series of computing nodes, each node representing a feature of the data set, and one or more weighted interconnections between various nodes. The nodes are stored, for example as objects in a data storage, and the weights associated with the interconnections may, for example, be stored as data records associated with the nodal objects in the data storage.

The neural network is maintained over a period of time in the data storage, and weights of the interconnections are updated as data is received. The legacy test automation data is already classified and may be a data structure including at least a string representing a natural language description along with the steps identified by a tester in running the particular test corresponding to the natural language description. The steps may be provided in the form of computational instruction sets, including simulated inputs (e.g., mouse click at (X,Y)), login parameters, access credentials, interactions with interactive visual elements (e.g., dropdowns, pick lists, radio buttons). In some embodiments, the computational instruction sets are specific computer-based instructions for interaction with a rendered interface (e.g., simulating to how a human user would interact with an interface).

The neural network is trained over a period of time with classified data such that the weights of the interconnections become biased over time to identify correct relationships between features of the language description and features of the particular steps and computational instruction sets. The order of steps taken may be of importance as it may be nonsensical to take some steps without a dependent step being taken first (e.g., a user can't pay a bill if the user has not logged into online banking yet). The neural network may include a reinforcement tuning mechanism whereby a reward or punishment function is adapted to bias the outputs of the neural network towards a particular outcome. For example, a reward may be recorded if the neural network is able to reach a particular screen, and a punishment may be recorded if an alternate screen is reached that is not helpful for the test case.

The neural network is maintained on the system, and in some embodiments, the system is a special purpose machine that is designed as an data infrastructure for supporting the automatic generation and/or execution of test scripts based only on natural language descriptions, free of human input. The special purpose machine, for example, could be a rack-mounted appliance configured for placement within or coupling with a data center, coupled to an interface (e.g., a message bus) where natural language strings may be received from a human tester and provided to the special purpose machine.

A tester provides test automation descriptions as strings in natural language (e.g., "Test online banking functionality for cross-border transfers for accounts held by the same person, test run on mobile device and during the hours of 3 AM-4 AM EST"). The neural network is utilized to identify and/or classify tokenized sections of the natural language strings to produce a set of outputs based on the training received by the neural network from the legacy test automation data.

The test outputs may include, for example, a test script that can be run to conduct the test described by the tester, the test script including specific actions that need to be taken and the order in which they need to be taken. In an alternate embodiment, the outputs could be compiled binaries containing object code, which when executed by a processor, cause the processor to run the actual tests and to record the outputs (e.g., storing screenshots for verification or checking for the presence of error/success codes). In yet another alternate embodiment, the special purpose machine also automatically executes the test scripts to run the tests, recording the outputs of the test (e.g., storing screenshots for verification or checking for the presence of error/success codes).

In accordance with an aspect, there is provided a computer implemented system for generating one or more test automation scripts for one or more test cases based on received one or more natural language strings representing a natural language description of the one or more test cases. The system is implemented on at least one processor operating in conjunction with computer memory.

The system includes a token extraction engine configured to receive the one or more natural language strings and parse the one or more natural language strings to extract one or more word vectors representing extracted features of the one or more natural language strings; and a natural language classification engine configured to provide the one or more word vectors into a neural network having a first layer, a second layer, and a third layer. The word vectors and the one or more natural language strings are stored in a data storage.

Accordingly, the system is configured to receive a granular representation of test automation data represented in a database model (the test case, it's test steps, the test action for each test step, and the test parameters that are associated the each action) and correlates the natural language representation of the description of the test step to the context of the rest of the test steps (meaning the other test actions, parameters and the position of the step in the whole test case).

The neural network is maintained by the natural language classification engine. The neural network includes multiple layers.

A convolutional neural network is trained for sentence classification, where the input data is formatted as a pairing of the sentence that describes the test step and the associated test action. The model architecture used is a k-dimensional word vector with two non-static channels which represents the sentence of n length. The mapping between actions and test descriptions is conducted by the neural network classifying the description to the action after it has been trained.

The system is pre-trained to provide an initial mapping of natural language to a general action to be performed by the test step.

The first layer is configured for embedding the one or more word vectors into a d-dimensional vector space, where d is based upon a variable length of words of the one or more word vectors, generating a first intermediate output of n vectors, where n is the number of words. The first convolutional layer of the network creates feature maps for multiple filter widths, in an example, specifically 100 feature maps per filter window.

The second layer is configured for mapping the one or more word vectors into a fixed-size vector and processing the fixed-size vector through a rectifier activation function to yield a second intermediate output representative of a granularity of the words. The second layer, in some embodiments, receives the feature map and widths and executes a max-over-time pooling operation over the feature map and takes the max value as the corresponding feature to the filter, which captures the most important feature for each feature map.

The third layer is configured as a logic regression layer for receiving the first intermediate output and the second intermediate output and combining the first intermediate output and the second output to map the natural language description into a vector space indicative of whether the one or more word vectors of the natural language description are related with one another. For example, the third layer may be a regularization layer which utilizes dropout at a rate of 0.5.

After a classification is made in respect of one or more test actions to be taken, the neural network is utilized to focus in on a subset of test parameters to utilize for the test action that has been identified by the convolutional neural network. A reinforcement learning model can utilize, for example, the A3C approach, which is comprised of a reward function, a set of inputs and one or multiple agents representing a single environment. The reward function is a representation of how to positively or negatively reinforce behaviour dictated by a set of inputs taking place in the agents.

The reward function observes the state of the environment on the agent and scores whether the environment is in a positive or negative state. The set of inputs is a defined set of actions available to be taken in an environment.

The system operates in conjunction with test automation agents which are instanced environments where the inputs take place and the state is observed for reward measurement. In some embodiments, the specialized reward function for test generation requires per application tuning in order to optimize the effectiveness. The system generates the one or more test automation scripts based on at least on the mapping of the vector space, the test automation script configured to, when executed, cause a processor to perform the pre-defined action in accordance with the one or more parameter values.

Accordingly, the system generates usable test data/configurations for test cases, based on an intent computationally derived from an input test description in natural language and robustly explore permutations of inputs and intelligently converging on an agreeable state.

In accordance with another aspect, the neural network is pre-trained using a reinforcement learning model, wherein the pre-training is conducted using pre-classified natural language test descriptions generated by human testers that are not native English speakers.

In accordance with another aspect, the neural network is pre-trained by assigning one or more rewards based on performance, the one or more rewards associated with an accuracy score obtained through review of output accuracy of one or more test automation scripts generated in response to one or more received training natural language strings.

In accordance with another aspect, the neural network, in performing the processing, is configured to estimate the sentiment or the context based at least one of: a test action being performed, a location of a test step in a test case, one or more actions performed prior to a current step, and a composite sub-classification of a natural language description of the test action, the location, or the one or more actions performed prior to the current step.

The estimation is representative of a computational inference based on training of the neural network, whose interconnections between data objects (e.g., nodes) representing features and their weights (indicating a level of connection/correlation) are tuned over a period of time. For example, in the neural network, the nodes represent neurons and the weights can represent how correct/incorrect something is based on a particular task being performed.

In accordance with another aspect, the neural network is further configured to infer the sentiment based on the location of the test step in the test case by comparing against processed information associated with one or more other steps of the test case.

In accordance with another aspect, the neural network is further configured to identify one or more dependencies in the test case, and to select parameters based at least on the identified one or more dependencies.

In accordance with another aspect, the generation of the test automation scripts is conducted using a reinforcement learning engine configured to store a set of actions including at least strings and pre-defined values representative of one or more valid computational actions available within a computing application.

In accordance with another aspect, the reinforcement learning engine is configured to track one or more states, each state associated with a corresponding reward and stored as a computational dictionary where string attributes are paired with an integer reward wherein the string attributes represent the one or more states of the application by denoting a presence or an absence of graphical qualities rendered on a graphical user interface, and wherein for each string attribute of the string attributes detected in a particular state, the reinforcement learning engine rewards a corresponding reward value from the computational dictionary.

In accordance with another aspect, the set of actions taken and the rewards awarded are mapped to a computational function to determine whether a softmax activation is triggered. The softmax activation is an indication that the reward function is moving in a positive direction.

In accordance with another aspect, for each action of the set of actions, metadata representative of the state upon which the application was in during the action is recorded as a hashmap object. The hashmap object, in some embodiments, is a Python™ dictionary object which is a hashmap that associates keys to values.

Many further features and combinations thereof concerning embodiments described herein will appear to those skilled in the art following a reading of the instant disclosure.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 15 is a block schematic of an example computing system, according to some embodiments.

DETAILED DESCRIPTION

Figure 1A:
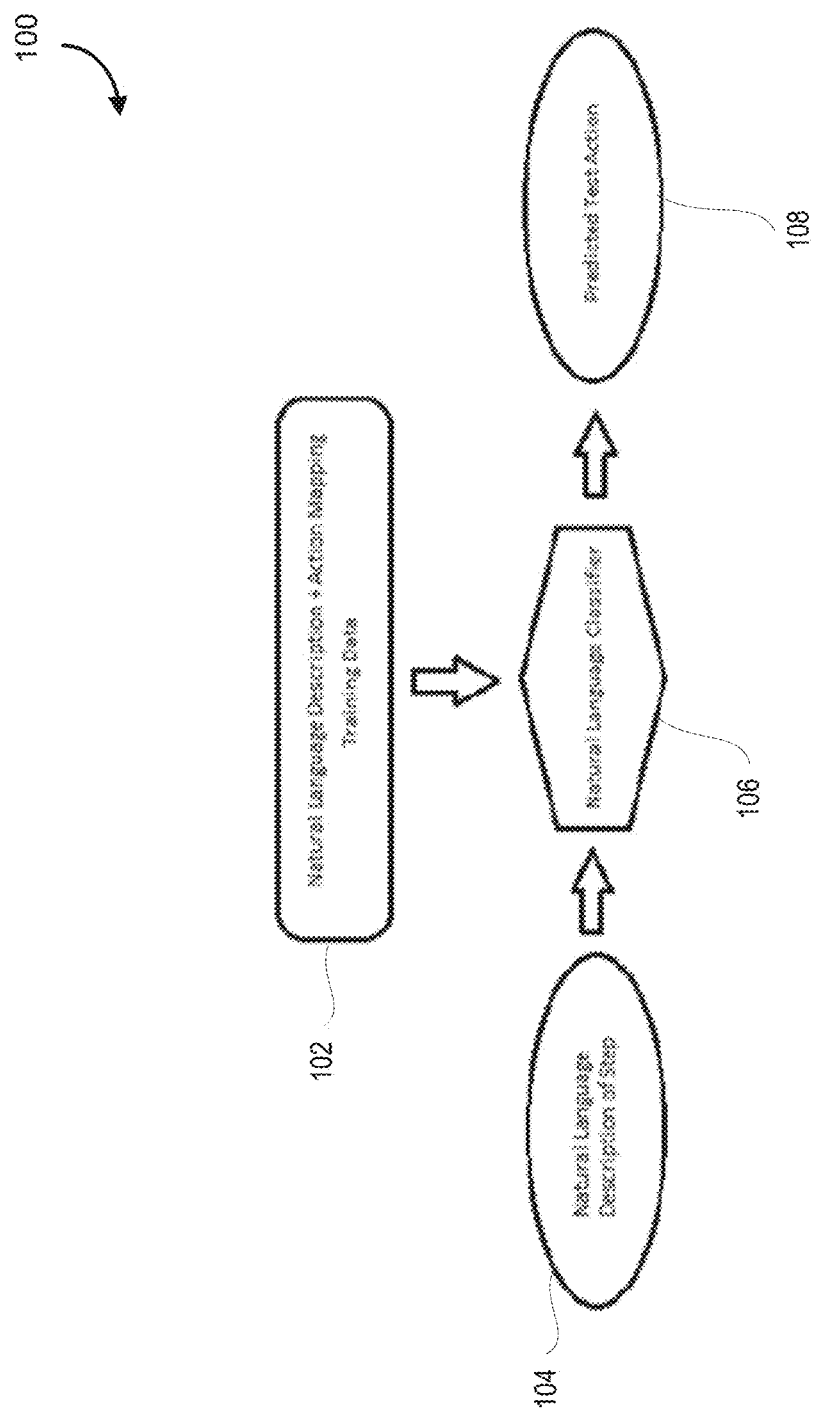
FIG. 1A is a method diagram of a natural language classification flow, according to some embodiments.

Embodiments of methods, systems, and apparatus are described through reference to the drawings.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Although a tester can perform his/her task without a test automation framework, test automation frameworks are generally used to provide guideline to build a logically sound and functional test case. Test automation frameworks typically provide an ineffective way of encouraging consistency in test case authoring. One problem that arises from the traditional approach is the technical learning curve involved in authoring automated test cases.

An automation developer often is required to build a logical, functional test case that utilizes existing test actions (and develop new actions) within an automation framework. Those actions (depending on the scope of the actions and design of the framework) are then configured granularly with parameters that define the behaviour of the test actions.

These actions involve a significant a manual effort in order to author tests that exercise the various use cases in an application. Although the manual effort reduces over time when properly built, given a large enough application and functionality to test, test automation would still require a significant manual effort for each release of an application to test effectively.

For many large development projects, resources available to perform this role effective are limited. However, resources that understand the logic of an application but do not have the technical skills are usually more readily available. For example, a business analyst, or a project manager for an application project can understand how to use the application and how to navigate the application as a user.

A potential objective of this solution is to more efficiently utilize the resources of a project team using various machine learning methods. A neural network-based approach is proposed whereby a trained neural network system is utilized as a computationally-driven approach to reduce or eliminate the need for a human test engineer to translate natural language descriptions of test cases to specific test actions.

A computational approach for generating test scripts based on natural language descriptions of test cases is provided described herein.

The computational approach utilizes a specially configured neural network, pre-trained using legacy test automation data, to identify at least one of a correlation to functional intent and functional language. The computational approach automatically associates (e.g., adds, generates) usable test data/configurations for test cases. The ability to accurately classify natural language sentences to identify an intent and robustly explore permutations of inputs and intelligently converging on an agreeable state makes the use of neural networks (e.g., convolutional neural networks) and reinforcement learning ideal.

In particular, as described in various embodiments, a computer-implemented natural language classifier solution is proposed that utilizes neural networks to implement a machine learning model whereby a natural language description (e.g., a natural language input string) of an action a tester is processed such that the appropriate script (e.g., a more granular application-based test action) that would perform that action within an automation framework can be selected (or in some embodiments, configured) while testing an application. The neural network, in some embodiments, is also configured to select parameters for conducting tests, and the selection of parameters is also evaluated and refined over time to improve accuracy.

Accordingly, with such a trained system, a business analyst or a project manager may be able to provide high level step descriptions and expected results, and the system may be automatically driven to map these to granular, application specific test actions, along with necessary parameters (e.g., user/account credentials, form field values). The system may be configured to identify and apply state variables, parameter variables, user/account credentials, as necessary based on its identification of the particular action and its required inputs for various test scenarios.

These state variables, parameter variables, user/account credentials may vary depending on the particular identified test (and/or dependencies identified within a test case), and depending on the context of the natural language description as predicted by the system, different state variables, parameter variables, user/account credentials, etc. may be more useful for different types of actions. For example, for an automated account funds transfer action, a selected dummy account may need to have existing funds in place so that the transfer can properly clear. Accordingly, the system, when defining the test action (or sub-action) for this scenario may be biased to select an account (and its account credentials) having existing funds. On the other hand, for a test where only a log in is required (e.g., checking hyperlinks and making sure they connect to extant webpages), there may be no need for the use of account that has funds and accordingly, any account may be used.

Where the system incorrectly identifies test actions or parameters, refinement of the model may automatically be triggered when a user, for example, takes corrective action (e.g., selects the correct test action or parameters).

A natural language classifier is a machine learning model that has the ability to parse "natural language" and classify that language to a high level topic. Various training models may be utilized in instantiating and refining the classifier. In the context of test case authoring, a properly trained natural language classifier would be able to take a natural language description of an action a tester would like to perform while testing an application and pick the appropriate script that would perform that action within an automation framework. Training data may be used to prepare a reinforcement learning model, where test descriptions are pruned and using a corpus of legacy data that may already exist.

Using existing legacy data for the application, the system is configured to process the natural language descriptions of a test step manually written by a quality assurance resource and the generalized "action" that the description maps to. A convolutional or a neural network can be configured to parse the descriptions and make an association between the "meaning" of the description and the test action selected. The method flow of FIG. 1 illustrates a portion of a solution, according to some embodiments.

The training data input 102 for the classifier can include natural language descriptions and their associated test actions.

The system can include a token extraction engine configured to receive the one or more natural language strings and parse the one or more natural language strings to extract one or more word vectors representing extracted features of the one or more natural language strings.

For example, a natural language description may be:

"Open the browser to the banking homepage and login using a regular account"—and "Login" may be test action within testing framework. "Login" would be a test script containing code that executes to perform the test action of logging into the application, contained within a "keyword". The natural language classifier would machine-interpret these keywords as classifications for the natural language descriptions. The set of data required to train the natural language classifier could be pairs of natural language descriptions and their respective test actions as seen in FIG. 1.

Over a sufficiently corpus of data sets, the neural network classifier refines iteratively and a trained neural network is provided.

The classifier will be able to build word vectors out of the training data 102 that represent the sentiment and context of the original description and classify similar descriptions to the same action. The pre-trained neural network is a classifier that includes a series of computing nodes, each node representing a feature of the data set, and one or more weighted interconnections between various nodes. The nodes are stored, for example as objects in a data storage, and the weights associated with the interconnections may, for example, be stored as data records associated with the nodal objects in a data storage.

A natural language classification engine is provided by the neural network, and the neural network has at least three layers, a first layer, a second layer, and a third layer. The word vectors and the one or more natural language strings are stored in a data storage.

The first layer is configured for embedding the one or more word vectors into a d-dimensional vector space, where d is based upon a variable length of words of the one or more word vectors, generating a first intermediate output of n vectors, where n is the number of words. The first convolutional layer of the network creates feature maps for multiple filter widths, in an example, specifically 100 feature maps per filter window.

The second layer is configured for mapping the one or more word vectors into a fixed-size vector and processing the fixed-size vector through a rectifier activation function to yield a second intermediate output representative of a granularity of the words. The second layer, in some embodiments, receives the feature map and widths and executes a max-over-time pooling operation over the feature map and takes the max value as the corresponding feature to the filter, which captures the most important feature for each feature map.

The third layer is configured as a logic regression layer for receiving the first intermediate output and the second intermediate output and combining the first intermediate output and the second output to map the natural language description into a vector space indicative of whether the one or more word vectors of the natural language description are related with one another. For example, the third layer may be a regularization layer which utilizes dropout at a rate of 0.5.

The neural network is maintained over a period of time in the data storage, and weights of the interconnections are updated as data is received. The legacy test automation data is already classified and may be a data structure including at least a string representing a natural language description along with the steps identified by a tester in running the particular test corresponding to the natural language description. The steps may be provided in the form of computational instruction sets, including simulated inputs (e.g., mouse click at (X,Y)), login parameters, access credentials, interactions with interactive visual elements (e.g., drop-downs, pick lists, radio buttons). In some embodiments, the computational instruction sets are specific computer-based instructions for interaction with a rendered interface (e.g., simulating to how a human user would interact with an interface).

The neural network is trained over a period of time with classified data such that the weights of the interconnections become biased over time to identify correct relationships between features of the language description and features of the particular steps and computational instruction sets. The order of steps taken may be of importance as it may be nonsensical to take some steps without a dependent step being taken first (e.g., a user can't pay a bill if the user has not logged into online banking yet). The neural network may include a reinforcement tuning mechanism whereby a reward or punishment function is adapted to bias the outputs of the neural network towards a particular outcome. For example, a reward may be recorded if the neural network is able to reach a particular screen, and a punishment may be recorded if an alternate screen is reached that is not helpful for the test case.

Tweaking the weight of the rewards is a part of optimizing the solution as well. For example, if the system 100 is too sparse with rewards (e.g., by only allowing precise favorable outcomes to render a reward), then it will take a much longer time to learn than if the system 100 were configured to provide partial rewards to semi-favorable behavior.

The neural network is maintained on the system, and in some embodiments, the system is a special purpose machine that is designed as an data infrastructure for supporting the automatic generation and/or execution of test scripts based only on natural language descriptions, free of human input. The special purpose machine, for example, could be a rack-mounted appliance configured for placement within or coupling with a data center, coupled to an interface (e.g., a message bus) where natural language strings may be received from a human tester and provided to the special purpose machine.

Output of the Natural Language Classifier

A tester provides test automation descriptions as strings in natural language. The neural network is utilized to identify and/or classify tokenized sections of the natural language strings to produce a set of outputs based on the training received by the neural network from the legacy test automation data.

Once a classifier has been sufficiently trained, the system can then be configured to receive the input a natural language description 104 of a test action that is desired to be implemented, such as: "Open a web browser to the bank site's main page and use normal credentials to login to the account".

"Login" should be returned as the output based on this natural language description of a step as an input to the trained classifier. The above is an example of a sufficiently unique natural language description of the same action as the above test action, "Login".

After a classification is made in respect of one or more test actions to be taken, the neural network is utilized to focus in on a subset of test parameters to utilize for the test action that has been identified by the convolutional neural network. A reinforcement learning model can utilize, for example, the A3C approach, which is comprised of a reward function, a set of inputs and one or multiple agents representing a single environment. The reward function is a representation of how to positively or negatively reinforce behaviour dictated by a set of inputs taking place in the agents.

The reward function observes the state of the environment on the agent and scores whether the environment is in a positive or negative state. The set of inputs is a defined set of actions available to be taken in an environment.

In some embodiments, the neural network can be provided the state and the action to be taken as an input to identify one or more dependencies in the test case, and to select parameters based at least on the identified one or more dependencies. For example, user credentials for use in a login may be different if a test case has a step where certain characteristics or attributes of the account are important.

For example, selecting a dummy account having funds in it may be important for a funds transfer use case, and the system is configured to, over time, based on the processed natural language processing, identify that the potential use case/test actions 108 will require, such characteristics, and will be biased towards selecting a specific dummy account or dummy accounts having the required characteristics.

The test outputs may include, for example, a test script that can be run to conduct the test described by the tester, the test script including specific actions 108 that need to be taken and the order in which they need to be taken. In an alternate embodiment, the outputs could be compiled binaries containing object code, which when executed by a processor, cause the processor to run the actual tests and to record the outputs (e.g., storing screenshots for verification or checking for the presence of error/success codes). In yet another alternate embodiment, the special purpose machine also automatically executes the test scripts to run the tests, recording the outputs of the test (e.g., storing screenshots for verification or checking for the presence of error/success codes).

The system operates in conjunction with test automation agents which are instanced environments where the inputs take place and the state is observed for reward measurement. In some embodiments, the specialized reward function for test generation requires per application tuning in order to optimize the effectiveness. The system generates the one or more test automation scripts based on at least on the mapping of the vector space, the test automation script configured to, when executed, cause a processor to perform the pre-defined action in accordance with the one or more parameter values.

Accordingly, the system generates usable test data/configurations for test cases, based on an intent computationally derived from an input test description in natural language and robustly explore permutations of inputs and intelligently converging on an agreeable state. In accordance with another aspect, the generation of the test automation scripts is conducted using a reinforcement learning engine configured to store a set of actions including at least strings and pre-defined values representative of one or more valid computational actions available within a computing application.

Using a Reinforcement Learning Model

Reinforcement learning is a concept that can be provided in a sufficiently configured machine. Computer-based implementations of neural networks are used as a predictive method to conduct test automation, reducing or eliminating the need for humans having specific skills or expertise.

The neural network is configured to infer a sentiment or a context based on at least one of: a test action being performed, a location of a test step in a test case, one or more actions performed prior to a current step, and a composite sub-classification of a natural language description of the test action, the location, or the one or more actions performed prior to the current step. In accordance with another aspect, the neural network is further configured to infer the sentiment based on the location of the test step in the test case by comparing against processed information associated with one or more other steps of the test case.

In accordance with another aspect, the neural network is pre-trained using a reinforcement learning model, wherein the pre-training is conducted using pre-classified natural language test descriptions generated by human testers that are not native English speakers. The non-native aspects of the test descriptions is beneficial from a computing perspective as the neural network won't scrutinize the grammatical errors/inconsistencies in the language used because the natural language parser was trained using a set of "English" with the same errors and inconsistencies. Accordingly, the use of non-native English training allows the natural language comprehension to be subjective to the people writing the test descriptions rather than what English should be.

The neural network can be pre-trained by assigning one or more rewards based on performance, the one or more rewards associated with an accuracy score obtained through review of output accuracy of one or more test automation scripts generated in response to one or more received training natural language strings. The reinforcement training is also adapted to identify one or more dependencies in the test case, and to update nodes and interconnections such that when a new test description is encountered, the neural network can be utilized to select parameters based at least on identified one or more dependencies.

In accordance with another aspect, the reinforcement learning engine is configured to track one or more states, each state associated with a corresponding reward and stored as a computational dictionary where string attributes are paired with an integer reward wherein the string attributes represent the one or more states of the application by denoting a presence or an absence of graphical qualities rendered on a graphical user interface, and wherein for each string attribute of the string attributes detected in a particular state, the reinforcement learning engine rewards a corresponding reward value from the computational dictionary. The set of actions taken and the rewards awarded are mapped to a computational function to determine whether a softmax activation is triggered. Metadata representative of the state upon which the application was in during the action is recorded as a hashmap object and retrieved when classifying a new natural language test description.

Figure 1B:
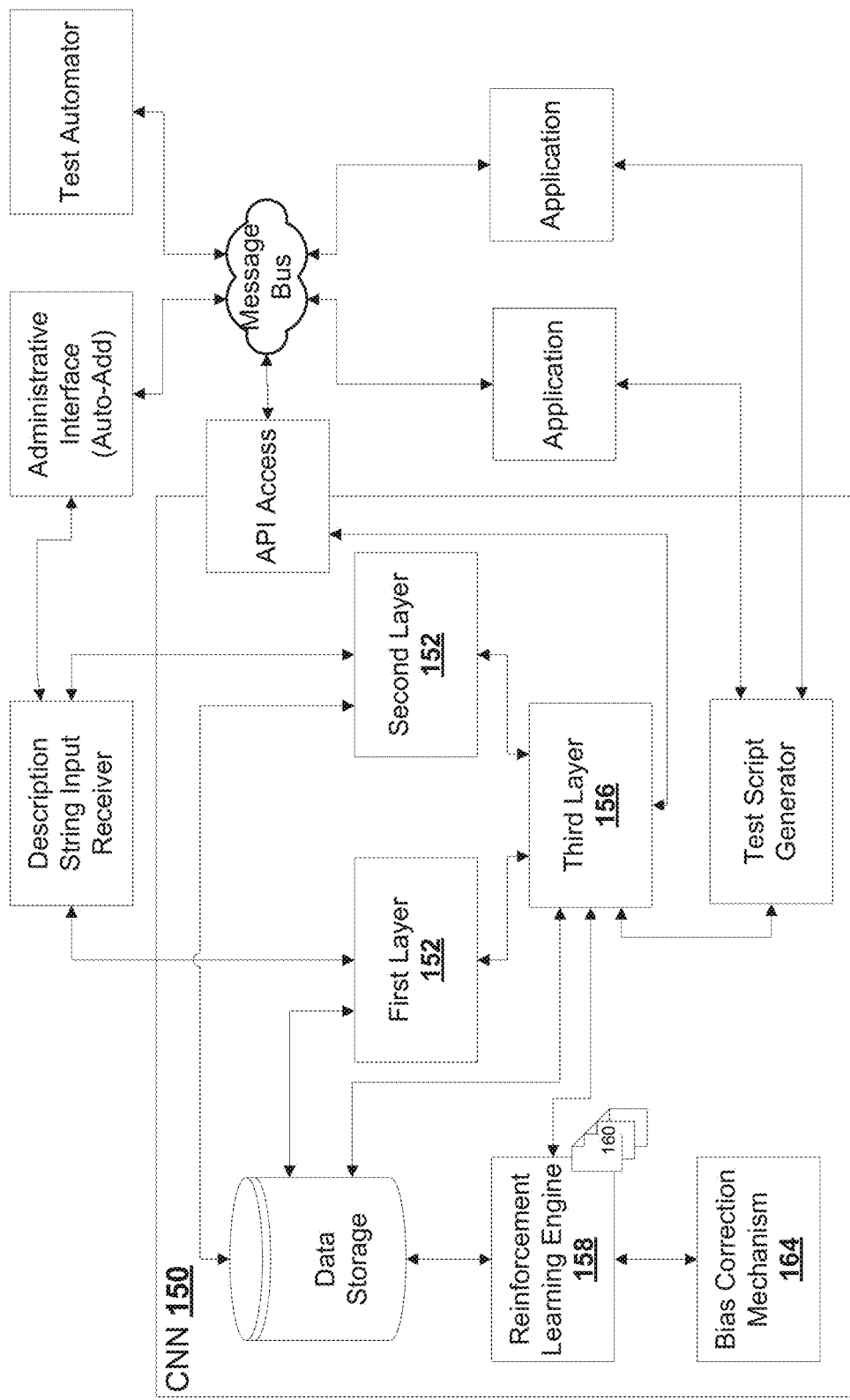
FIG. 1B is a block schematic diagram illustrative of an example system, according to some embodiments.

FIG. 1B is an example 3 layer convolutional neural network (CNN), according to some embodiments. The test description is provided as an input into CNN 150 to provide natural language context for the application being tested. The CNN 150 receives instructions from a description string input receiver, which in some embodiments, receives input strings as provided in a natural language interface. The description string input receiver, in an embodiment, includes a token extraction engine that is configured to parse the natural language strings to extract word vectors.

The natural language strings provided include a first string indicative of a step description (e.g., "Enter valid login credentials"), and a second string indicative of an expected result (e.g., "Amount transferred successfully from one account to another"). The CNN 150, as described below, automatically determines a test action and/or associate parameters based on the step description string and the expected result string.

The word "engine" is directed to a computer implemented mechanism, including one or more software or hardware components that are specially configured to perform one or more actions or to perform one or more computations. The engine, in some embodiments, describes software implemented code modules or components, and in other embodiments, describes hardware implementations including specially configured machines. A combination of hardware and software is possible.

There are three layers, a first layer 152, a second layer 154, and a third layer 156. The terms "first", "second", and "third" do not imply ordinality in the layers; the layers, in various embodiments, can be implemented in different orders. There may be additional layers in between, for example, additional layers are possible and the implementation is not limited to 3 layers. The 3 layer CNN 150 is configured to classify semantic similarity in the description and expected results description, and can, in some embodiments, be implemented in Pytorch (A Python deep learning framework).

The first layer 152 is configured for embedding of the words into a d-dimensional vector space (d=variable length of words) using embedding techniques which outputs n vectors (n=number of words). Embedding approaches include processing the words as a corpus of text, and generating a vector space where each unique word in the corpus is assigned a corresponding vector within the vector space (e.g., as vectors of real numbers). Both of the step description string and the expected result string are utilized in the embedding and stored and represented as features thereof, which facilitate the classification, through the neural network, of the test action (based on weights indicating interconnections as trained by the training data).

Test data can consist of thousands of rows of text pairings that show different ways testers have described in natural language what the Test step should be doing. Training of the neural network provides a foundation of how the CNN 150 will accurately classify descriptions to test actions.

Word embeddings, in some embodiments, are conversions of words into numbers, which are then utilized for processing within the neural network. A vector, for example, can include a vector such as [0,0,0,0,1]. Different approaches to vectorization and embedding are possible. For example, in some embodiments, the words of the natural language description may be interconnected, for example, through a co-occurrence window and variations thereof.

Table 1 is an example mapping of words that are ultimately classified into test actions:

| Test Description | Test Action |
|---|---|
| Log into the application | Login User |
| I want to log into the application | Login User |
| User logs in to test application | Login User |
| As a regular user of the application, log in by providing credentials | Login User |
| Verify database row | Execute SQL query |
| Check database for the following values | Execute SQL query |
| Query database and validate the output | Execute SQL query |
| Execute a query on the database | Execute SQL query |

The second layer 154 is configured to map words into a fixed-size vector and provide the results through a rectifier activation function which outputs a granularity of the words (their mentions, their context).

The results of the first layer 152 and the second layer 154 are provided into a final logic regression layer (third layer 156) that is adapted to map the text into a vector space that is configured to inform about whether the word vectors are related to each other. The test actions determined computationally to most likely map to the test description based on the training are output. In some embodiments, a graphical user interface receives the outputs and renders a populated form field indicating the test action (and parameters) for execution (e.g., responsive to an auto-add button activation).

In an alternate embodiment, the test actions (and their parameters) corresponding to one or more natural language string descriptions are encapsulated by a test script generator (e.g., a test script generation engine) in the form of a test script that is configured to be compiled or executed (if encapsulated as object code and/or a compiled binary) for execution by the one or more processors. The execution of the tests can be performed, for example, on one or more simulated applications hosted in testing environments. A test automator program may control the overall execution of tests and/or test scripts. Test automation can include end to end testing, functional verification tests, scenario verification tests, among others.

An application layer built in Python™ gives programmatic access to the classification function the model provides, and for example, can be exposed as an API layer in a web application using the Django™ web framework in Python™.

A reinforcement learning engine 158 is provided that includes set of actions 160 (strings and pre-defined values) that are stored in a list object (e.g., a Python List object).

The actions of the list object define what are valid actions that are possible in the application. This can be user defined per application that is being tested. Legacy (previously existing) test parameters are used as the "universe" of inputs that are allowed the reinforcement learning engine 158 to use. As an example, a test parameter "username" can have the values ['admin', 'user1', 'user2'] as possible valid 'actions' to be performed as the configuration for the test parameter.

One or more states are defined, and may be associated to rewards associated to them. The states, for example, can be stored in Python dictionaries, whereby string attributes are paired with their numerical reward (an integer that can be positive or negative) and string attributes describe the state of the application by denoting the presence or absence of qualities (such as text on the page such as error messages, or images such as the top banner of an application).

If the attribute is detected in the state, it will be rewarded with the correlating value from the dictionary. Reward functions are defined on a per application approach.

An example reward of "Valid" can be provided when the set of parameters used for a test step results in a positive outcome as defined by the application. Example: when a test step attempts to "login" to the application using a username/password pair that results in a successful login is positively rewarded.

In another example, when a test step attempts to "login" to the application using a username/password pair that results in an error message that indicates the credentials exist, but are "invalid", the reinforcement learning engine 158 provides a less positive reward because the credentials exist, but were invalid.

In another example, when a test step attempts to "login" to the application using a username/password pair that results in an error message that indicates the credentials do not exist and are invalid, and the reinforcement learning engine 158 will provide no reward The reinforcement learning engine 158 includes an agent process that is configured (e.g., using numpy (a python numerical/scientific library) and reward functions (softmax)) to track the rate in which rewards are won by following actions in the predefined set for the application. The actions taken and their rewards are mapped to a programmatic function that triggers whether the softmax activation occurs.

In some embodiments, the metadata 162 of the state in which the action was performed is also recorded by the model in a hashmap object (e.g., a Python hashmap object). The metadata 162 includes the position in the sequence of test steps the parameter is in, what other test actions are in the test case, what test action (if any) directly precedes and follows the parameter, the number of occurrences of a particular test parameter. For example, the hashmap can be configured to use the action as the key and the encountered metadata as the value. The hashmap is a collection class used to store key and value pairs, storing values by key and provides interfaces that can be utilized for manipulating the stored data.

After a period of training (varies depending on the application being tested, ranges from 15 minutes to 5 hours), the agent becomes computationally "aware" of what action/set of actions results in larger or maximum rewards through updated interconnections in the nodes of the neural network.

The agent, once trained, is configured to receive a string representative of a "state" as input (text values) that correlate to metadata that was observed during the agent's training and output a recommended action to take from a known set of valid actions (e.g., by running the input through the neural network to obtain a classification result). For example, ['value', 2, 'check page', ['login', 'run sql', 'update values', 'logout'], 'login', 'run sql', 1] is a list that shows respectively the parameter, the position, the action, the list of actions in the test step, the preceding action, the following action and the number of occurrences.

The output from the agent would be "welcome" to show that it's checking for a welcome message in the state.

In some situations, the reinforcement learning agent encounters issues in relation to bias. For example, the agent can become preemptively biased towards a set of actions and will not explore further because the computational nodes and the underlying connections represent an indication that the current set is the optimal path, even though the agent has not computationally explored all other possibilities.

This problem can solved specifically per application being tested, and a general approach is to add "noise" in the form of artificially reducing the reward of the current "optimal" path by temporarily reducing the reward of the perceived optimal action(s) in order to have the agent continue to explore.

A bias correction mechanism 164 can be provided in some embodiments as a reinforcement learning noise injector to overcome issues with computational bias. The bias correction mechanism 164 can be configured to add noise in an application specific approach.

As an example in a simulated test environment:
1. A test parameter has ['hello', 'goodbye', '1', '2', '3', '4', '5']
2. The agent inputs 'hello', and gets +2 as a reward
3. The agent inputs 'goodbye' and gets +1 as a reward
4. The agent inputs '1' and gets 0 as a reward
5. The agent inputs '2' and gets 0 as a reward
6. The agent returns to trying 'hello' because it has now been biased that 'hello' is the path to a max reward for this situation, but '4' actually rewards +3.

The reinforcement learning engine 158 is configured to query the history of the reward function and find that 'hello' is the highest reward so far, and to determine that the reinforcement learning engine 158 has also not fully explored all possible inputs, so the bias correction mechanism 164 artificially (but programmatically) reduces the reward for 'hello' to 0 so the learning algorithm continues to explore other possible inputs.

As an end to end example in operation, pre-training may include the following steps:
Training the CNN 150 on a collection of description/ expected results to test action mappings in a dictionary that can recommend the test action based on new descriptions.
Preparing an reinforcement learning engine 158 having an A3C agent trained on a set of valid parameters (provided by legacy test step parameters) as defined above.
Adding the second test step in a test case is added on an interface with the following values: Description String: "Mobile: attempt sample online banking inter-account transfer, across multiple versions of iOS, across Chrome, Safari app browsers."
Expected Results: Success/Fail (e.g., 3D array of bSuccessfuLogin, listed against strOSVersion, strBrowserType).

In some embodiments, a test automator may then select an auto-add mechanism (e.g., an auto-add button), which invokes a function call to the CNN 150 and maps the description string, along with the expected results in an attempt to automatically derive the action to be taken along with one or more parameters. In an embodiment, the test automator is human and interacts with the auto-add mechanism by way of computer inputs, such as a mouse click, after inputting a natural language description of what the test step should be. In alternate embodiments, the test automator, in some embodiments, is a processor configured to incrementally generate test steps by individually adding one step at a time to test cases based on received natural language descriptions of various steps.

When the auto-add mechanism is triggered, from the client side of the application, the 'Description String' and 'Expected Results' are aggregated into POST parameters as well as the test step number, and all of the other steps that are currently in the test case and their actions and sent to the backend (e.g., via an AJAX POST request) where the CNN 152 and the reinforcement learning engine 158 including an A3C RL agent are exposed as API endpoints. The auto-add mechanism is utilized to populate a "test action" field, which is a recommended test action that is output from the CNN 150 classifier.

The application calls the classify function with the description and expected results as parameters, which returns the recommended action "Transfer funds" based on the pre-trained CNN 150.

The storage is queried for the application which parameters are associated to the "Transfer funds" action and returns a Python™ list with them all: ['amount, fromAcct, 'toAcct'], and the list is passed into a downstream function that iterates through the list of parameters and formats input to be fed into the reinforcement learning engine 158 through the agent for a recommendation.

A recommendation may include, for example: ['amount', stepNumber, 'Transfer Funds', ['login, 'go to page', 'logout'], 'go to page', 'logout', 1] the formatted data is passed to the agent, which returns '1000' as the output.

The data formatting is repeated for 'fromAcct' and 'toAcct', which is then is passed to the agent which receives '0000001', '1000001' as output respectively.

Accordingly, the data from the interaction of both the CNN 150 and the reinforcement learning engine 158 through the agent can be deserialized and packaged into a proper HTTPResponse object and transmitted to the client side application.

A client side application then receives the data and updates the user interface with the "Transfer funds" test action as well as the parameter values for the appropriate test parameters. These steps can be repeat for the next test step with updated data, and so on.

Figure 2:
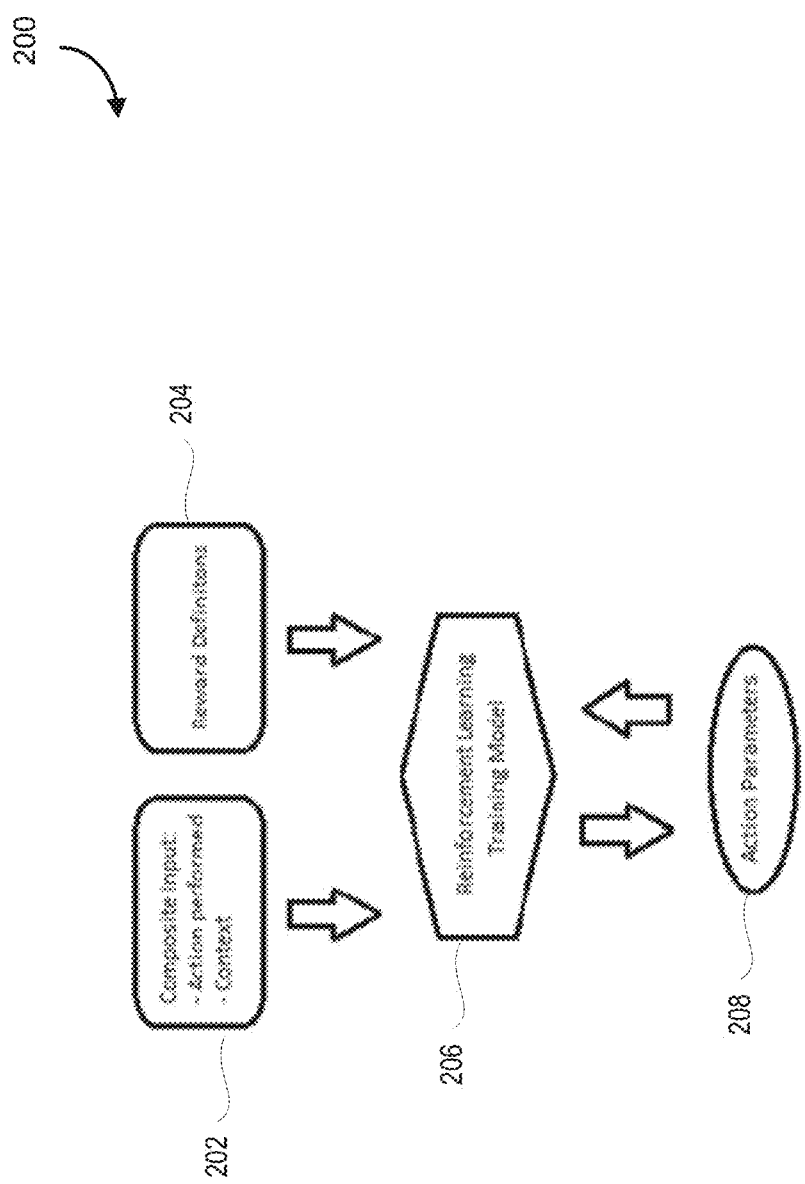
FIG. 2 is a method diagram of a reinforcement learning model flow, according to some embodiments.

FIG. 2 is illustrative of a reinforcement learning model flow learning that is based in behavioural psychology. In FIG. 2, a composite input 202 may be received, along with a reward definition set 204. The neural network (represented by reinforcement learning training model 206) is trained by taking in the set of inputs and assigning resulting output rewards based on performance (e.g., the reward definitions are data structures that associate performance outcomes with various types of "awards", the awards track-able for optimization, for example, by a Minimax approach). Parameters are checked for rewards and the reward provisioning is used to continuously train the model 206. The outputs are classified as action parameters 208. Some experiments have indicated that it may take up to a day to train the reinforcement learning model.

Given a large number of iterations of unique data, the system may be able to predict with a reasonable amount of accuracy what an "acceptable" output should be. In some embodiments, the system is configured to accept a range of "acceptable" outputs, or have a varying definition of "acceptable" outputs. For example, multiple "acceptable" outputs may be identified, and in some scenarios, the system is configured to select the most "acceptable" output of the "acceptable" outputs. In an example, the score/rewards may be reduced where a user changes the test case action after the system attempted to predict the correct test action (and likely failed), and accordingly, the reinforcement model is less incentivized (by way of biasing) to "predict" this path in the future.

In the context of test case authoring, "input" for the reinforcement learning model is formulated by taking the set of: (1) the test action being performed, (2) the location of the test step in the test case, (3) the actions performed prior to the current step, and (4) a composite sub-classification of the natural language description of the above items.

Using existing legacy test data, the system can define "rewards" as the collection of parameter values for test actions for the set of inputs as listed above. Given a large enough set of data, the system should be able to generate a contextually relevant and appropriate value. This value can then be used for a parameter of a test action to configure the test step to perform a contextually relevant action. This component as seen in FIG. 2 is representative of the second half of the proposed solution, according to some embodiments.

For example, rewards may be associated with an accuracy score or metric obtained through review of output accuracy, among others. In an end to end example, input may be contexts of test cases, natural language descriptions, and expected results, along with test actions.

Training Input for the Reinforcement Learning Model
Initial Input

As seen in FIG. 2, the reinforcement learning model 206 is configured to receive a test action (which comes from the natural language classifier component), and is configured to process the test step's relative location in the test scenario as a whole.

For example:
Transfer Funds—The test action taking place, classified by the Natural Language Classifier:
(The fourth step in the test scenario) The test step's location in the whole scenario
(Step 1)—(Login)—(NL Description)—The first step in the scenario
(Step 2)—(Navigate to Accounts Page)—(NL Description)—The second step
(Step 3)—(Navigate to Transfer Page)—(NL Description)—The third step Parameters may be extracted from the natural language description, and an agent may be provided that waits for input, interprets test data, and generates key-value pairings for providing into the reinforcement model. The composite of this data is packaged as a set of inputs to the reinforcement learning model to train on.

Reward Definition and Subsequent Input

Based off of the input from the initial input, the system is configured to score the output which are seen as rewards. The system them processes this output and uses the output as subsequent input for learning model. Outputs may be characters that satisfy a particular criteria as generated by the model, and the outputs may be scored. The model may continue iterating until a particular threshold score is reached. The model will learn (depending on the score and the permutations of the input) what inputs will result in higher rewards, and thus more accurate parameter outputs. This process can continue indefinitely, but there could be a point in which there will not be enough of a difference in input to produce an improved result for the output.

Output of the Reinforcement Learning Model

The output of the model will be test action parameters, that uniquely configure the behaviour of the test action, as classified and about in accordance with the method of FIG. 1.

Figure 3:
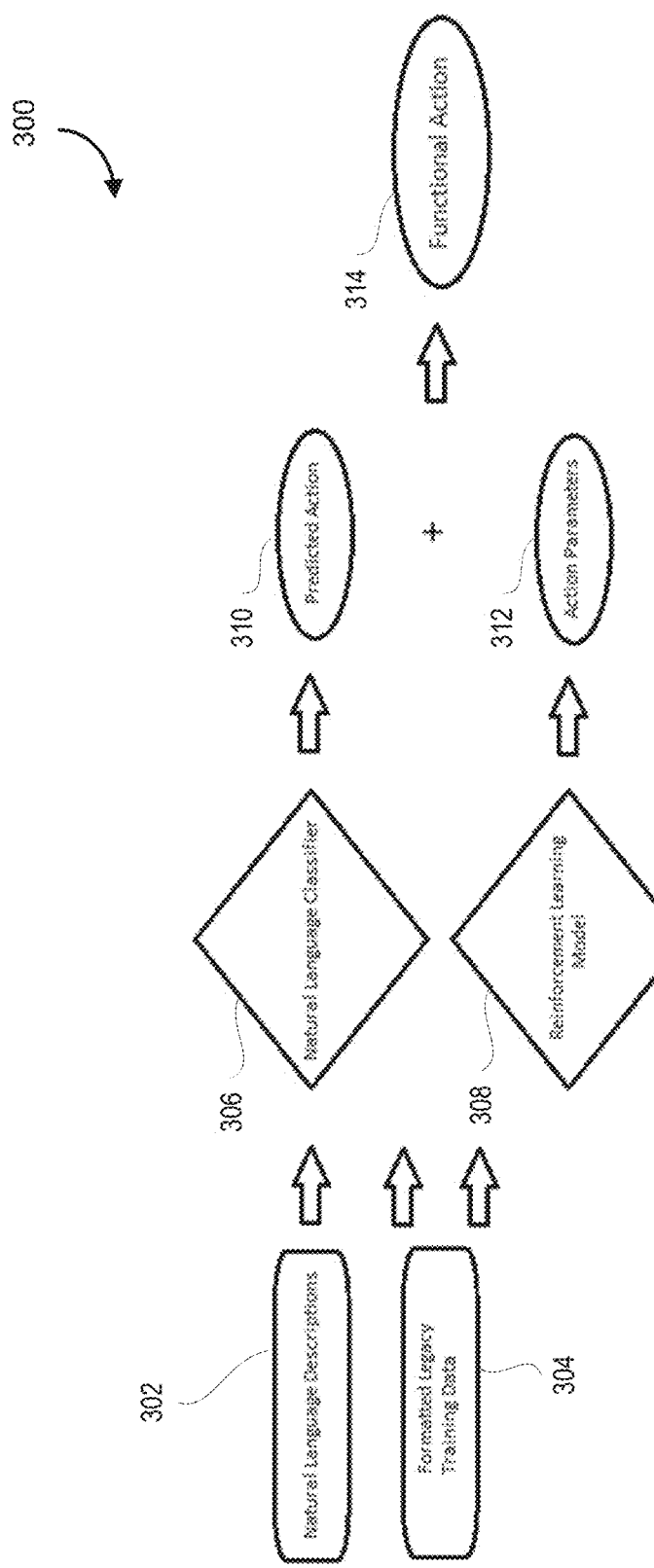
FIG. 3 is a method diagram implemented by a natural language processing system, according to some embodiments.

The resulting product as seen in FIG. 3 utilizes natural language descriptions 302 (and training data 304) for actions (e.g., configuration of a natural language classifier 306 and subsequent use of a reinforcement learning model 308) to perform within a test case for an application and producing an automated test case without any technical input or development effort from the test case author's perspective.

The trained natural language classifier 306, for example, is configured to receive input natural language strings and to infer the sentiment or the context based various factors (e.g., a test action being performed, a location of a test step in a test case, one or more actions performed prior to a current step, and a composite sub-classification of a natural language description of the test action, the location, or the one or more actions performed prior to the current step). In some cases, the sentiment is determined based on the location of the test step in the test case by comparing against processed information associated with one or more other steps of the test case. This sentiment can be utilized, for example, to identify which potential test action is best from a mapping perspective.

The trained natural language classifier 306 may be retrained through iterations of the reinforcement learning model 308 to improve its accuracy over time, for example, through the optimization of "rewards" (e.g., weighted desired outcomes).

The trained natural language classifier 306 is utilized to generate predicted actions 310, and in conjunction with the reinforcement learning model 308, action parameters 312 are identified that are used for continuous learning through the provisioning of rewards. Outputs may be provided in the form of JSON data structures having three values (e.g., amount, from account, to account).

Functional actions 314 are identified by the system which are then implemented in test cases for test automation. These functional actions, for example, may include the mapping to specific functionality of an application under test, including, but not limited to, specific application function calls, input parameters, timing of function calls, the order of function calls, etc. Continuous refinement of the reward pathway is used to modify outcomes or parameter value predictions.

Illustrative Screenshots

Figure 4:
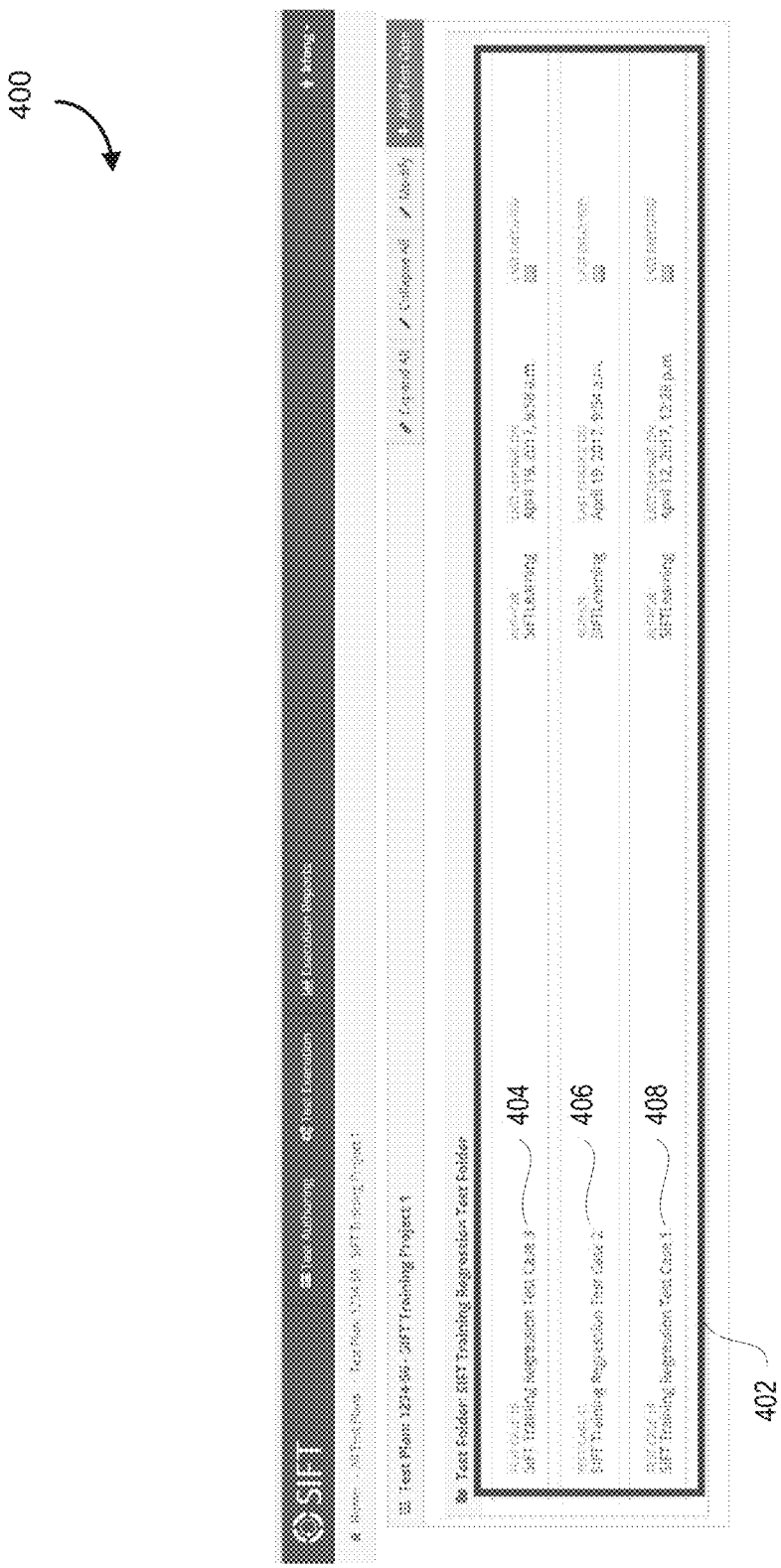
FIG. 4 is a screenshot of an interface screen, according to some embodiments.

FIG. 4 is a screenshot 400 of an interface screen, where a program, SIFT, is shown having a set of regression tests 402 (test cases 1, 2 and 3 (408, 406, 404), respectively.

Figure 5:
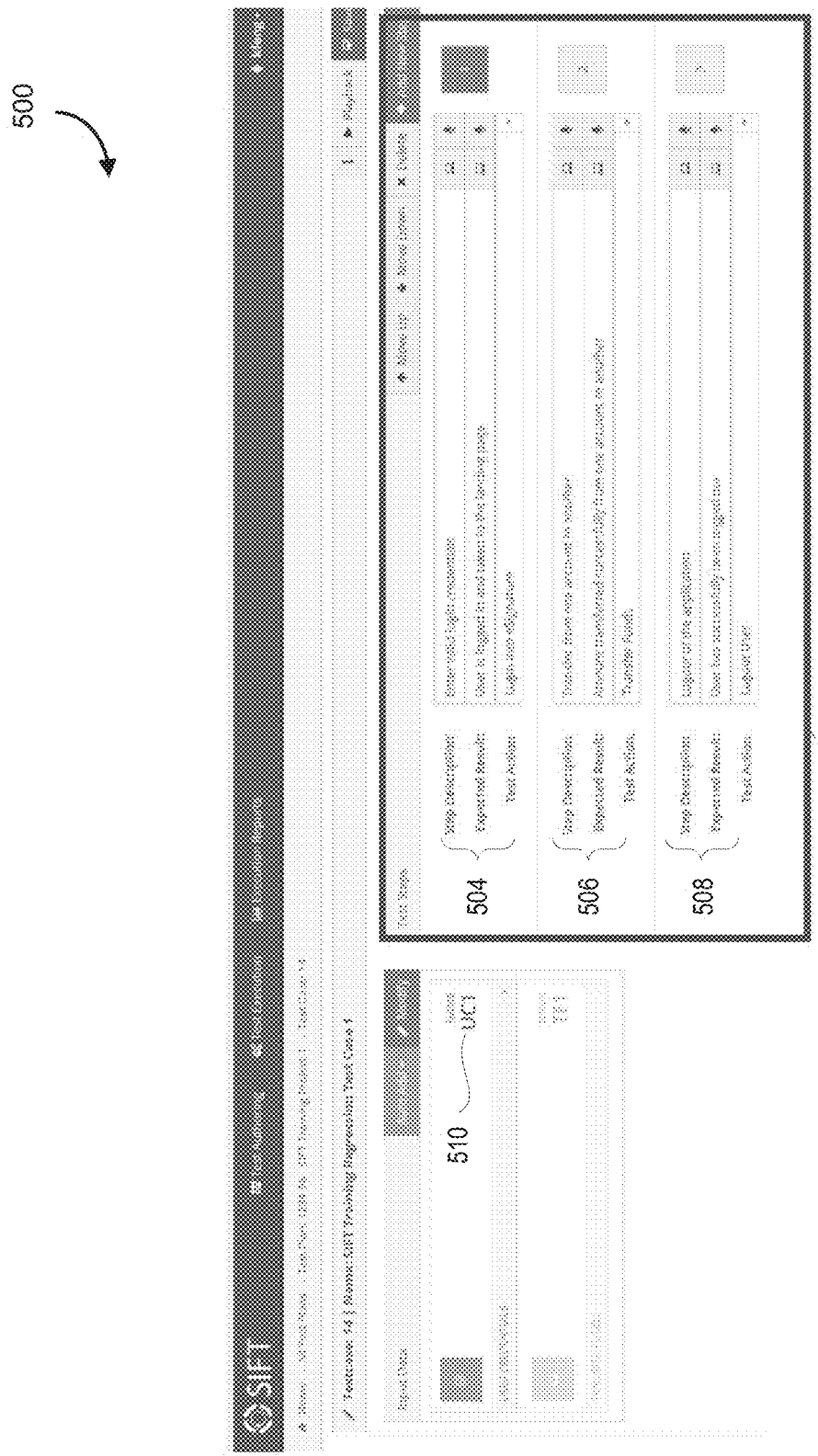
FIG. 5 is a screenshot of an interface screen, according to some embodiments.

FIG. 5 is a screenshot 500 of an interface screen, where an interface is shown whereby a user is able to provide a set 502 of step descriptions, expected results, and test actions, each grouped together (504. 506, 508). The input data is provided in relation to use credentials 1 (510). Each test case has a set of test steps, with natural language step descriptions input by testers as well as test actions, which are normally selected by testers manually.

Figure 6:
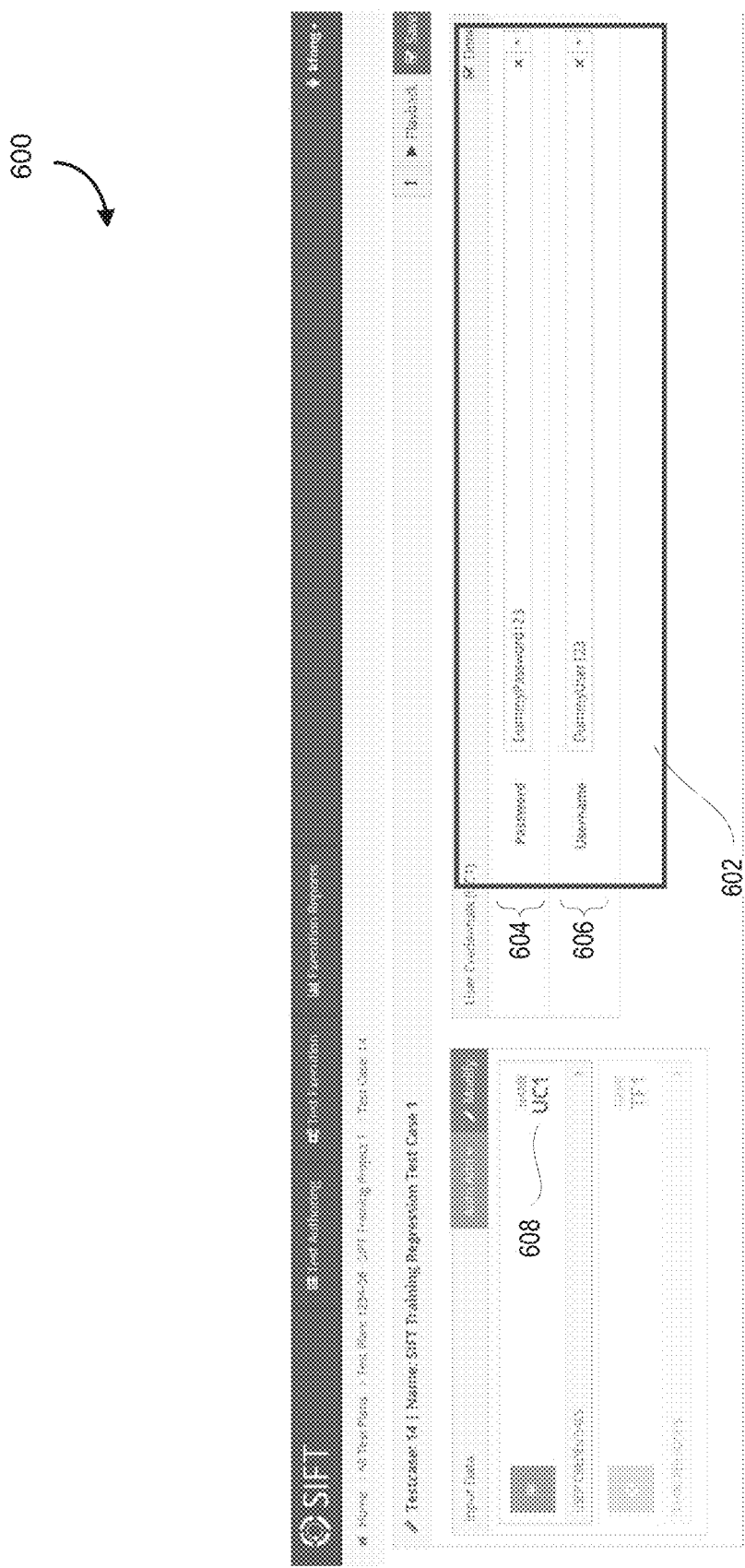
FIG. 6 is a screenshot of an interface screen, according to some embodiments.

FIG. 6 is a screenshot 600 of an interface screen, where an interface is provided in relation to defining use credentials 1 608. User credentials 1 may be provided in a pair 602, including a password 604 and a username 606. The screenshot 600 illustrates that the test steps also have parameters associated with them to configure how the selected test actions are performed.

Figure 7:
FIG. 7 is a screenshot of an interface screen, according to some embodiments.

FIG. 7 is a partial view 700 of an interface screen. Step descriptions 702, 708, and 714 are provided, along with expected results 704, 710, 716. These are used by the system to predict test actions. For the training data shown (e.g., existing use cases), the system processes test actions 706, 712, 718 in training the neural network.

The system, through the trained classifier, associates step descriptions and expected results (as input by the tester) to automatically classify what test action it belongs to. The training is conducted through the use of a reinforcement learning model, and the system, iteratively, over time, improves its accuracy.

Figure 8:
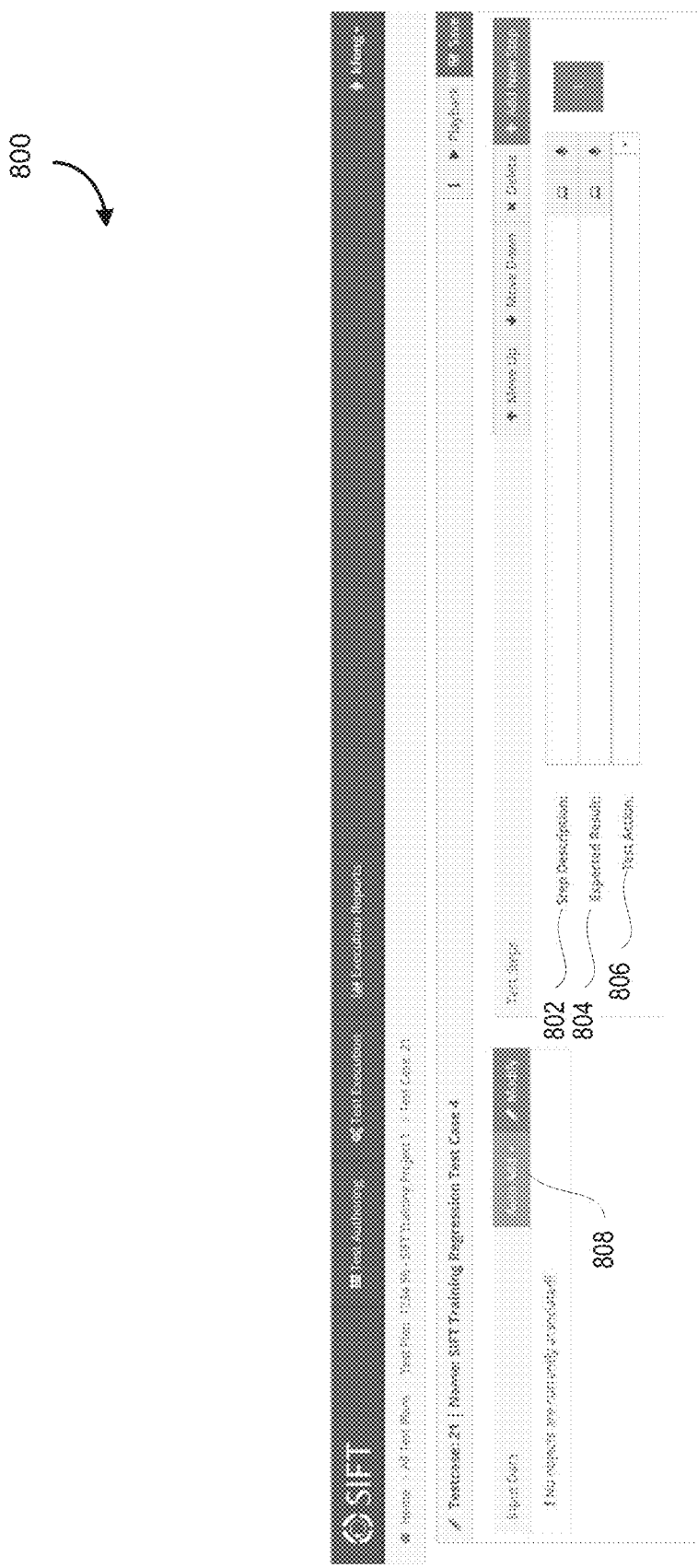
FIG. 8 is a screenshot of an interface screen, according to some embodiments.

FIG. 8 is a screenshot 800 of an interface screen, whereby additional steps can be created by populating in fields 802, 804, and 806, and interactive interface element 808 is provided to allow a user to indicate to the system that the test action should be automatically determined.

Figure 9:
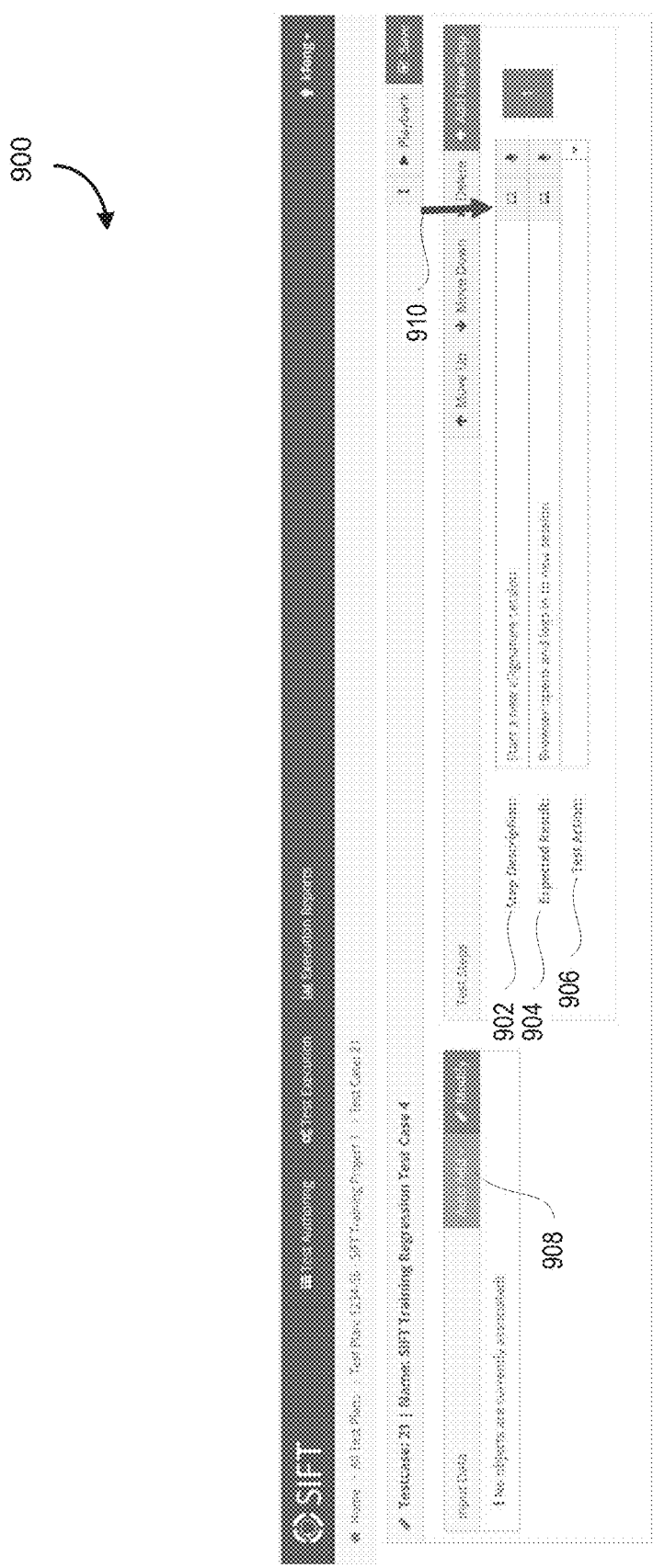
FIG. 9 is a screenshot of an interface screen, according to some embodiments.

FIG. 9 is a screenshot 900 of an interface screen, whereby additional steps are populated in fields 902, and 904. Note that field 906 is still blank, and interactive interface element 908 is provided to allow a user to indicate to the system that the test action should be automatically determined. A new test case, having an empty test step 806 is thus provided.

Figure 10:
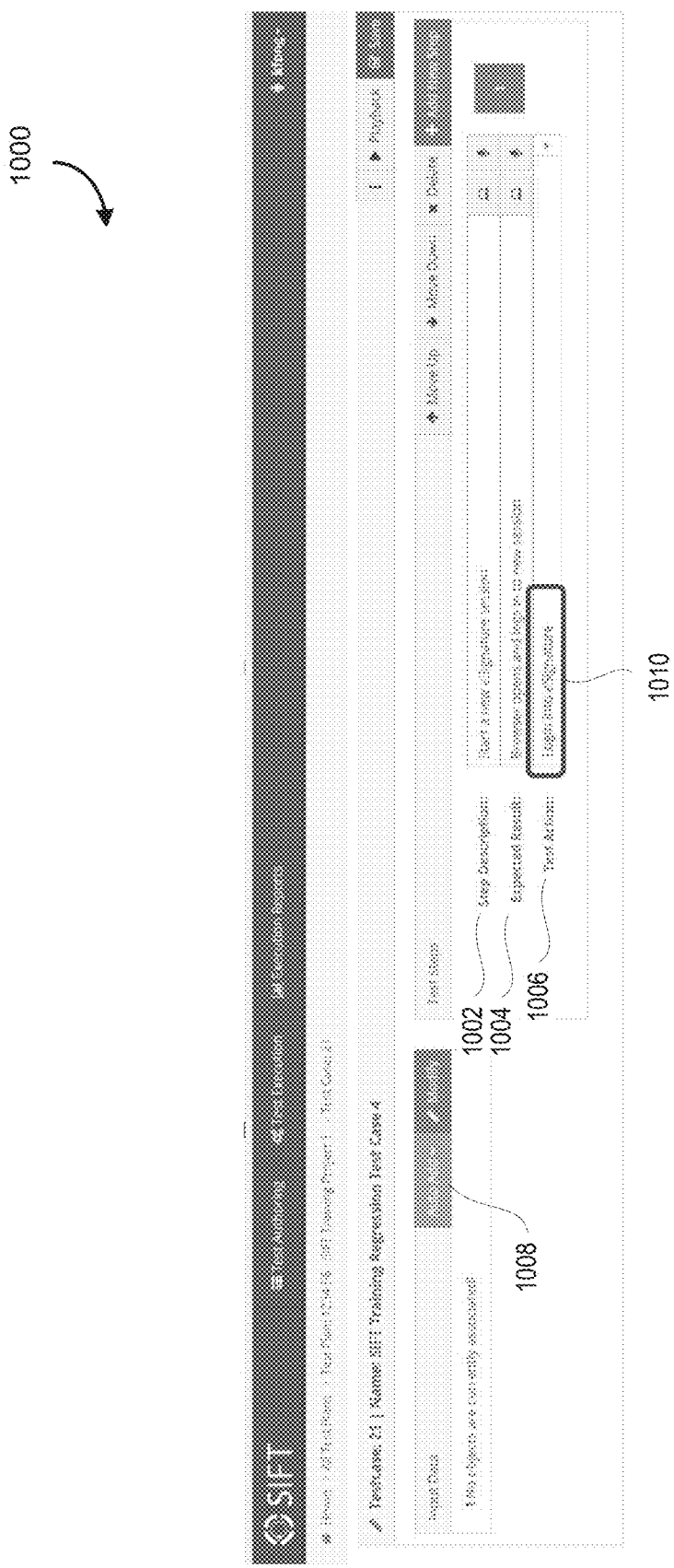
FIG. 10 is a screenshot of an interface screen, according to some embodiments.

FIG. 10 is a screenshot 1000 of an interface screen, whereby additional steps can be created by populating in fields 1002 and 1004, and interactive interface element 1008 was triggered to automatically determine field 1006 (as shown in the highlight 1010).

In this example, the action "Login to eSignature" is automatically selected by the classifier taking the step description and the expected result as input into the model that was trained on previous test steps.

If the action selected was incorrect, selecting a new action will further train the classifier with the new input so that the classifier will more accurately select actions based on descriptions and results on future uses.

Figure 11:
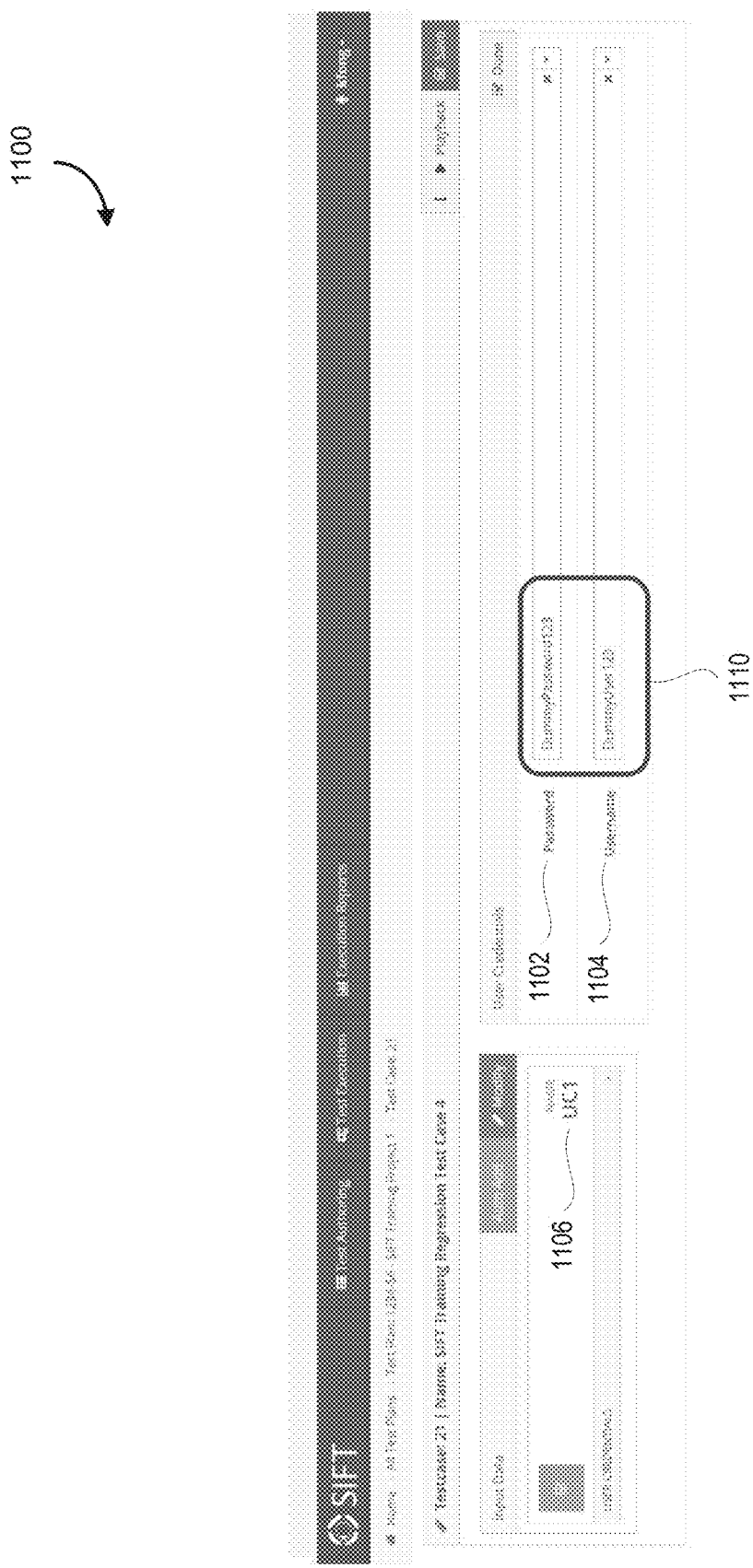
FIG. 11 is a screenshot of an interface screen, according to some embodiments.

The reinforcement learning model then takes in as input for this application: the position of the test step in the test case, the test action that was selected by the classifier, the step description and the expected result, and generates best guess parameters as output, as shown in FIG. 11.

FIG. 11 is a screenshot 1100 of an interface screen, whereby user account credentials for a dummy account are shown (password 1102, username 1104, credential pair 1110, and identifier 1106).

Similar to the test action, correcting these parameters automatically generate a message (e.g., a flag) to the reinforcement learning model that it was incorrectly generated, and subsequent parameters generated will take the incorrect generation into account.

Figure 12:
FIG. 12 is a screenshot of an interface screen, according to some embodiments.

FIG. 12 is a screenshot 1200 of an interface screen for a transfer funds use case, where different test action sets 1202 and 1204 are shown (the name of the scenario is denoted as TF1 1206).

Subsequent test steps follow the same methodology: a tester inputs a description and a result, and the action is automatically selected.

Figure 13:
FIG. 13 is a screenshot of an interface screen, according to some embodiments.

FIG. 13 is a screenshot 1300 of an interface screen for the transfer funds use case, where test parameters 1308 are shown (amount 1302, from account 1304, and to account 1306) (the name of the scenario is denoted as TF1 1310).

In this example, parameters are generated again based on the input of the step description/result, action classified and place in the test case.

Figure 14:
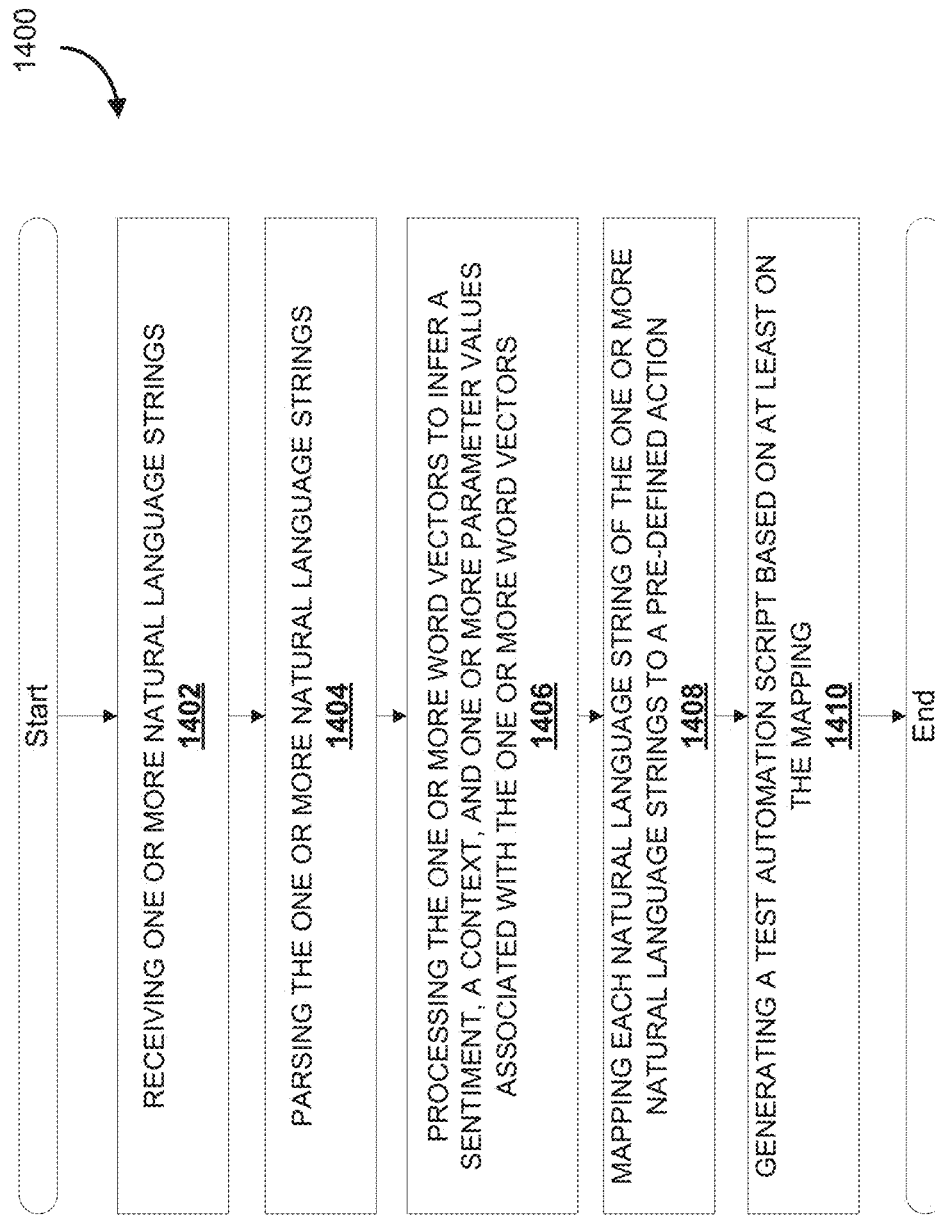
FIG. 14 is a method diagram illustrative of an example method, according to some embodiments.

FIG. 14 is a method diagram illustrative of an example method 1400, according to some embodiments.

The example method includes, at 1402, receiving one or more natural language strings, at 1404, parsing the one or more natural language strings to extract one or more word vectors, at 1406, using a neural network, processing the one or more word vectors to infer a sentiment, a context, and one or more parameter values associated with the one or more word vectors, at 1408, using the neural network, mapping each natural language string of the one or more natural language strings to a pre-defined action within an automation framework, the mapping based at least on one of the one or more word vectors, the inferred sentiment, and the context, and at 1410, generating a test automation script based on at least on the mapping, the test automation script configured to, when executed, cause a processor to perform the pre-defined action in accordance with the one or more parameter values. The neural network may be configured to process one or more key value pairs (e.g., in JSON), whereby each pair includes a key (step description/expected result), and the value being a test action. In some embodiments, the system is entirely automated and there is no control available over neural network parameters.

FIG. 15 is a block schematic of an example computing system, according to some embodiments.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

FIG. 15 is a schematic diagram of computing device 1500, exemplary of an embodiment. As depicted, computing device includes at least one processor 1502, memory 1504, at least one I/O interface 1506, and at least one network interface 1508.

Each processor 1502 may be, for example, microprocessors or microcontrollers, a digital signal processing (DSP) processor, an integrated circuit, a field programmable gate array (FPGA), a reconfigurable processor, a programmable read-only memory (PROM), or combinations thereof. Processors are be used to implement the neural network and the reinforcement learning model.

Memory 1504 may include a suitable combination of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM). Memory 1504 may be used to store test cases, test parameters, neural network parameters (e.g., state variables, weightings, neurons), etc.

Each I/O interface 1506 enables computing device 1500 to interconnect with one or more input devices, such as a keyboard, mouse, camera, touch screen and a microphone, or with one or more output devices such as a display screen and a speaker. These I/O interfaces 1506 can be utilized to interact with the system, for example, to provide test descriptions, train the system, among others.

Each network interface 1508 enables computing device 1500 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WMAX), SS7 signaling network, fixed line, local area network, wide area network, and others, including combinations of these. Computing devices 1500 may serve one user or multiple users. Network interfaces 1508 are utilized, for example, to interact with various applications, receive inputs from remote users, etc.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A computer implemented system, implemented on one or more processors operating in conjunction with computer memory, for generating one or more test automation scripts for one or more test cases based on received one or more natural language strings representing a natural language description of the one or more test cases, the system comprising:
   a token extraction engine configured to receive the one or more natural language strings and parse the one or more natural language strings to extract one or more word vectors representing extracted features of the one or more natural language strings;
   a pre-trained natural language classification engine configured to provide the one or more word vectors into a neural network having a first layer, a second layer, and a third layer, the pre-trained natural language classification engine pre-trained to map a pre-defined action to the one or more word vectors;
   the first layer configured for embedding the one or more word vectors into a d-dimensional vector space, the d-dimensional vector space based on a pre-trained mapping to associate word vectors and pre-defined actions, where d is based upon a variable length of words of the one or more word vectors, generating a first intermediate output of n vectors, where n is a number of words;
   the second layer configured for mapping the one or more word vectors into a fixed-size vector and processing the fixed-size vector through a rectifier activation function to yield a second intermediate output representative of a granularity of the words;
   the third layer configured as a logic regression layer for receiving the first intermediate output and the second intermediate output and combining the first intermediate output and the second intermediate output to map the natural language description into a vector space indicative of whether the one or more word vectors of the natural language description are related with one another and output the pre-defined action most likely map to the one or more word vectors;
   a reinforcement learning engine configured to receive a list of available parameters associated with the pre-defined action, and select one or more parameter values for use with the pre-defined action, the reinforcement learning engine pre-trained through an optimization process to optimize receipt of one or more rewards based on performance, the one or more rewards associated with an accuracy score obtained through review of output accuracy of the one or more test automation scripts generated in response to one or more received training natural language strings and for the pre-defined action, the one or more parameter values that led to detection of one or more state changes to states that are associated with the one or more rewards; and
   a test script generation engine configured to generate the one or more test automation scripts based at least on the mapping of the vector space, the pre-defined action, and the one or more parameter values that led to detection of one or more state changes to the states that are associated with the one or more rewards.

2. The system of claim 1, further comprising a bias correction mechanism that is configured to perturb the reinforcement learning engine by introducing noise into the optimization process, the noise adapted to modify reward provisioning parameters of a highest reward encountered so far of the one or more rewards by reducing award provided for the highest reward encountered so far such that the reinforcement learning engine continues to explore further possible parameter inputs.

3. The system of claim 1, wherein the neural network of the pre-trained natural language classification engine is pre-trained to infer an intent metric based on at least one of: the pre-defined action being performed, a location of the pre-defined action in a test case, one or more pre-defined actions performed prior to a current step, and a composite sub-classification of a natural language description of the pre-defined action, the location of the pre-defined action in the test case, or the one or more pre-defined actions performed prior to the current step.

4. The system of claim 3, wherein the neural network is further configured to infer the intent metric based on the location of the pre-defined action in the test case by comparing against processed information associated with one or more other pre-defined actions of the test case.

5. The system of claim 4, wherein the neural network is further configured to identify one or more dependencies in the test case, and to select the one or more parameter values based at least on the identified one or more dependencies.

6. The system of claim 1, wherein the generation of the test automation scripts is conducted using the reinforcement learning engine configured to store a set of actions including at least strings and pre-defined values representative of one or more valid computational actions available within a computing application.

7. The system of claim 6, wherein the reinforcement learning engine is configured to track one or more states, each state associated with a corresponding reward and stored as a computational dictionary where string attributes are paired with an integer reward wherein the string attributes represent the one or more states of the application by denoting a presence or an absence of graphical qualities rendered on a graphical user interface, and wherein for each string attribute of the string attributes detected in a particular state, the reinforcement learning engine rewards a corresponding reward value from the computational dictionary.

8. The system of claim 7, wherein the set of actions taken and rewards awarded are mapped to a computational function to determine whether a softmax activation is triggered.

9. The system of claim 8, wherein, for each action of the set of actions, metadata representative of the state upon which the application was in during the action is recorded as a hashmap object.

10. The system of claim 1, wherein the one or more test automation scripts are used for controlling a graphical user interface.

11. The system of claim 10, wherein the one or more parameter values are provided as inputs representing selected account credentials into the graphical user interface when controlled by the one or more test automation scripts.

12. A computer implemented method, implemented on one or more processors operating in conjunction with computer memory, for generating one or more test automation scripts for one or more test cases based on received one or more natural language strings representing a natural language description of the one or more test cases, the method comprising:

receiving the one or more natural language strings and parse the one or more natural language strings to extract one or more word vectors representing extracted features of the one or more natural language strings;

providing a pre-trained natural language classification engine configured to provide the one or more word vectors into a pre-trained neural network having a first layer, a second layer, and a third layer, the first layer configured for embedding the one or more word vectors into a d-dimensional vector space, the d-dimensional vector space based on a pre-trained mapping to associate word vectors and pre-defined actions, where d is based upon a variable length of words of the one or more word vectors, generating a first intermediate output of n vectors, where n is a number of words; the second layer configured for mapping the one or more word vectors into a fixed-size vector and processing the fixed-size vector through a rectifier activation function to yield a second intermediate output representative of a granularity of the words, the third layer configured as a logic regression layer for receiving the first intermediate output and the second intermediate output and combining the first intermediate output and the second intermediate output to map the natural language description into a vector space indicative of whether the one or more word vectors of the natural language description are related with one another and output the pre-defined action most likely map to the one or more word vectors;

providing a reinforcement learning engine configured to receive a list of available parameters associated with the pre-defined action, and select one or more parameter values for use with the pre-defined action, the reinforcement learning engine pre-trained through an optimization process to optimize receipt of one or more rewards based on performance, the one or more rewards associated with an accuracy score obtained through review of output accuracy of the one or more test automation scripts generated in response to one or more received training natural language strings and for the pre-defined action, the one or more parameter values that led to detection of one or more state changes to states that are associated with the one or more rewards;

and generating the one or more test automation scripts based at least on the mapping of the vector space, the pre-defined action, and the one or more parameter values that led to detection of one or more state changes to the states that are associated with the one or more rewards.

13. The method of claim 12, further comprising a bias correction mechanism that is configured to perturb the reinforcement learning engine by introducing noise into the optimization process, the noise adapted to modify reward provisioning parameters of a highest reward encountered so far of the one or more rewards by reducing an award provided for the highest reward encountered so far such that the reinforcement learning engine continues to explore further possible parameter inputs.

14. The method of claim 12, further comprising pre-training the pre-trained natural language classification engine by training the neural network to infer an intent metric based on at least one of: the pre-defined action being performed, a location of the pre-defined action in a test case, one or more pre-defined actions performed prior to a current step, and a composite sub-classification of a natural language description of the pre-defined action, the location of the pre-defined action in the test case, or the one or more pre-defined actions performed prior to the current step.

15. The method of claim 14, wherein the neural network is further configured to infer the intent metric based on the location of the pre-defined action in the test case by comparing against processed information associated with one or more other pre-defined action of the test case.

16. The method of claim 15, wherein the neural network is further configured to identify one or more dependencies in the test case, and to select the one or more parameter values based at least on the identified one or more dependencies.

17. The method of claim 12, wherein the generation of the test automation scripts is conducted using the reinforcement learning engine configured to store a set of actions including at least strings and pre-defined values representative of one or more valid computational actions available within a computing application.

18. The method of claim 17, wherein the reinforcement learning engine is configured to track one or more states, each state associated with a corresponding reward and stored as a computational dictionary where string attributes are paired with an integer reward wherein the string attributes represent the one or more states of the application by denoting a presence or an absence of graphical qualities rendered on a graphical user interface, and wherein for each string attribute of the string attributes detected in a particular state, the reinforcement learning engine rewards a corresponding reward value from the computational dictionary.

19. The method of claim 18, wherein the set of actions taken and rewards awarded are mapped to a computational function to determine whether a softmax activation is triggered.

20. A non-transitory computer readable medium storing machine interpretable instructions, which when executed, cause one or more processors to perform one or more steps corresponding to a method comprising:

receiving the one or more natural language strings and parse the one or more natural language strings to extract one or more word vectors representing extracted features of the one or more natural language strings;

providing the one or more word vectors into a pre-trained neural network having a first layer, a second layer, and a third layer, the first layer configured for embedding the one or more word vectors into a d-dimensional vector space, the d-dimensional vector space based on a pre-trained mapping to associate word vectors and pre-defined actions, where d is based upon a variable length of words of the one or more word vectors, generating a first intermediate output of n vectors, where n is a number of words; the second layer configured for mapping the one or more word vectors into a fixed-size vector and processing the fixed-size vector through a rectifier activation function to yield a second intermediate output representative of a granularity of the words, the third layer configured as a logic regression layer for receiving the first intermediate output and the second intermediate output and combining the first intermediate output and the second intermediate output to map the natural language description into a vector space indicative of whether the one or more word vectors of the natural language description are related with one another and output the pre-defined action most likely map to the one or more word vectors;

providing a reinforcement learning engine configured to receive a list of available parameters associated with the pre-defined action, and select one or more parameter values for use with the pre-defined action, the reinforcement learning engine pre-trained through an optimization process to optimize receipt of one or more rewards based on performance, the one or more rewards associated with an accuracy score obtained through review of output accuracy of the one or more test automation scripts generated in response to one or more received training natural language strings and for the pre-defined action, the one or more parameter values that led to detection of one or more state changes to states that are associated with the one or more rewards;

and generating the one or more test automation scripts based at least on the mapping of the vector space, the pre-defined action, and the one or more parameter values that led to detection of one or more state changes to the states that are associated with the one or more rewards.

* * * * *